(12) United States Patent
He

(10) Patent No.: US 11,888,382 B2
(45) Date of Patent: Jan. 30, 2024

(54) SCOOTER MOTOR

(71) Applicant: GOLDEN MOTOR TECHNOLOGY CO., LTD, Changzhou (CN)

(72) Inventor: Zhang He, Changzhou (CN)

(73) Assignee: GOLDEN MOTOR TECHNOLOGY CO., LTD, Changzhou (CN)

( * ) Notice: Subject to any disclaimer, the term of this patent is extended or adjusted under 35 U.S.C. 154(b) by 747 days.

(21) Appl. No.: 17/043,679

(22) PCT Filed: Apr. 17, 2020

(86) PCT No.: PCT/CN2020/085253
§ 371 (c)(1),
(2) Date: Sep. 30, 2020

(87) PCT Pub. No.: WO2020/228481
PCT Pub. Date: Nov. 19, 2020

(65) Prior Publication Data
US 2023/0133115 A1    May 4, 2023

(30) Foreign Application Priority Data

May 13, 2019  (CN) .......................... 201910391999.X

(51) Int. Cl.
| | |
|---|---|
| *H02K 7/102* | (2006.01) |
| *H02K 7/112* | (2006.01) |
| *F16D 55/38* | (2006.01) |
| *F16D 65/18* | (2006.01) |
| *B62M 7/12* | (2006.01) |

(Continued)

(52) U.S. Cl.
CPC .......... *H02K 7/1125* (2013.01); *F16D 55/38* (2013.01); *F16D 65/186* (2013.01); *B62M 7/12* (2013.01); *F16D 2121/16* (2013.01); *F16D 2121/22* (2013.01); *F16D 2127/04* (2013.01)

(58) Field of Classification Search
CPC ........ H02K 7/006; H02K 7/102; H02K 7/108; H02K 7/1125
See application file for complete search history.

(56) References Cited

U.S. PATENT DOCUMENTS

| | | | |
|---|---|---|---|
| 9,755,481 B2 * | 9/2017 | Kaun .......................... | B62J 6/08 |
| 2003/0162622 A1 | 8/2003 | Fusegi et al. | |

FOREIGN PATENT DOCUMENTS

| | | |
|---|---|---|
| CN | 101994770 A | 3/2011 |
| CN | 105221608 A | 1/2016 |

(Continued)

*Primary Examiner* — Dang D Le
(74) *Attorney, Agent, or Firm* — Bayramoglu Law Offices LLC

(57) ABSTRACT

A scooter motor includes a stator unit, a rotor unit and a brake unit. The stator unit is fixedly mounted on the fixed shaft of the motor, and the rotor unit is rotatably mounted on the fixed shaft. The brake unit includes a friction plate component and an electromagnetic clutch component. The electromagnetic clutch component is configured to drive the friction plate component to press to brake. According to the embodiment of the present invention, the scooter motor drives the rotor unit to rotate by the cooperation between the stator unit and the rotor unit to drive the scooter, additionally, the stator unit controls the rotation of the rotor unit by using the friction plate component and the electromagnetic clutch component to realize the braking of the scooter.

9 Claims, 5 Drawing Sheets

(51) Int. Cl.
  *F16D 121/16* (2012.01)
  *F16D 121/22* (2012.01)
  *F16D 127/04* (2012.01)

(56) References Cited

FOREIGN PATENT DOCUMENTS

| | | |
|---|---|---|
| CN | 206894433 U | 1/2018 |
| CN | 108462267 A | 8/2018 |
| CN | 109962570 A | 7/2019 |
| JP | 2004324576 A | 11/2004 |

\* cited by examiner

SCOOTER MOTOR

CROSS REFERENCE TO THE RELATED APPLICATIONS

This application is the national phase entry of International Application No. PCT/CN2020/085253, filed on Apr. 17, 2020, which is based upon and claims priority to Chinese Patent Application No. 201910391999.X, filed on May 13, 2019, the entire contents of which are incorporated herein by reference.

TECHNICAL FIELD

The present invention relates to the technical field of vehicle engineering, and more particularly, to a scooter motor.

BACKGROUND

Typically, motor is used in the walking wheels of wheelchairs, elderly scooters, supermarket electric shopping carts and construction site vans has the following two characteristics: (i) the motor is driven at a low speed and a high torque; and (ii) the motor can realize automatic braking and parking after being de-energized, and can realize manual-contact braking in case of failure.

At present, the prior arts mostly use a driven brush motor to drive or a brushless motor to cooperate with a reduction gearbox to work, and an electromagnetic clutch is added at the end of the motor to realize the parking brake function of the motor. However, the reduction gearbox occupies a large space and has a complex structure. Moreover, the redaction gearbox has a high noise and a low transmission efficiency after long-term wear. Especially for the wheelchairs, the noise seriously affects the user's experience and comfort. Currently, a large number of gearless hub motors used in electric vehicles have been able to provide the function of providing low speed and high torque in this type of application. However, it is very difficult to realize a high-torque de-energized automatic braking and parking function without gears to amplify the braking torque.

SUMMARY in order to solve the problem that the direct-drive scooter motor without gear deceleration cannot automatic brake and park after being de-energized in the prior art, the present invention provides a new scooter motor that adopts a direct-drive motor and omits a reduction gearbox, which not only simplifies a structure design of the scooter motor, but also improves a working efficiency of the scooter motor.

According to an embodiment of the present invention, the scooter motor includes a stator unit, a rotor unit and a brake unit. The stator unit is fixedly mounted on a fixed shaft of the motor, and the rotor unit is rotatably mounted on the fixed shaft. The brake unit includes a friction plate component and an electromagnetic clutch component. When the motor is de-energized, the electromagnetic clutch component is configured to drive the friction plate component to press to brake. The friction plate component includes a plurality of movable friction plates and a plurality of fixed friction plates. The movable friction plates and the fixed friction plates are stacked at intervals. The movable friction plates are linked with the rotor unit, and the fixed friction plates are slidably mounted on the fixed shaft and are limited in rotation. When the motor is de-energized, the electromagnetic clutch component drives the fixed friction plates to press the movable friction plates to brake.

According to an embodiment of the present invention, the scooter motor can not only drive the rotor unit to rotate by the cooperation between the stator unit and the rotor unit to drive the scooter to travel, but also control the braking of the rotor unit by using the friction plate component and the electromagnetic clutch component to cause the scooter to brake. The friction plate component includes a plurality of movable friction plates and a plurality of fixed friction plates, and the movable friction plates and the fixed friction plates are stacked at intervals. Compared with the single-disc friction plate component, a contact friction surface between the movable friction plates and the fixed friction plates is greatly increased, and a corresponding braking force is significantly improved. Besides, since the braking force generated by the electromagnetic clutch component is transmitted between the friction plate components that are stacked at intervals, the braking force is doubled, which can provide a high-torque de-energized automatic braking and parking function. Moreover, the scooter motor adopts the direct-drive motor and omits the reduction gearbox, which simplifies the structure design of the scooter motor and improves the working efficiency of the scooter motor.

According to an embodiment of the present invention, the electromagnetic clutch component includes an electromagnet, an armature and an elastic member. The electromagnet is sleeved on the fixed shaft and is fixedly connected to the fixed shaft. The armature is sleeved on the fixed shaft and slidably cooperates with the fixed shaft. The elastic member is configured between the armature and the electromagnet. When the motor is de-energized, the electromagnet is de-energized, and the armature presses the friction plate component under an action of the elastic member to brake.

According to an embodiment of the present invention, the electromagnet includes a suction cup and an electromagnetic coil. The suction cup is sleeved on the fixed shaft and is fixedly connected to the fixed shaft, and the suction cup is further provided with a containing groove for mounting the elastic rarer ber. The electromagnetic coil is built in the suction cup, and the electromagnetic coil is configured to attract the armature.

According to an embodiment of the present invention, the stator unit includes a stator fixed on the outer periphery of the suction cup, and a stator winding mounted on the stator. The stator is directly mounted on the suction cup to save a stator bracket.

According to an embodiment of the present invention, the rotor unit includes a rotor and a motor end cover. The rotor includes a magnetic conductive ring and a permanent magnet, and the magnetic conductive ring is sleeved on the permanent magnet and is fixedly connected to the permanent magnet. The rotor is arranged along the outer peripheral direction of the stator. The motor end cover includes a first end cover and a second end cover. The first end cover and the second end cover are integratedly connected by the magnetic conductive ring to form a closed internal accommodation space.

According to an embodiment of the present invention, the first end cover is rotatably mounted on the fixed shaft through a first bearing, and the second end cover is rotatably mounted on the fixed shaft through a second bearing.

According to an embodiment of the present invention, a linkage disc is fixed on a surface of the motor end cover facing the movable friction plates. A plurality of movable friction plate graspers are arranged along the peripheral direction of the linkage disc, and limiting grooves fit with the movable friction plate graspers are arranged along the peripheral direction of the plurality of the movable friction plates. The plurality of movable friction plates are configured on the linkage disc and are limited by the movable friction plate graspers. The motor end cover is linked with the movable friction plates through the linkage disc and the movable friction plate graspers.

According to an embodiment of the present invention, a spline is fixedly arranged on the fixed shaft, and a spline matched with the spline is arranged on the inner periphery of the fixed friction plates. The fixed friction plates are configured to slide relative to the fixed shaft, and the spline cooperates with the spline groove to prohibit the fixed friction plates from rotating relative to the fixed shaft.

According to an embodiment of the present invention, a limiting disc is arranged on the side of the spline far away from the armature. A brake part extends from a surface of the armature facing the fixed friction plates. The plurality of fixed friction plates are limited between the brake part and the limiting disc.

According to an embodiment of the present invention, the scooter motor further includes a manual brake release unit. The manual brake release unit includes a linkage member, a top ring and a rotation driving member. One end of the linkage member penetrates through the electromagnet and is fixedly connected to the armature. The other end of the linkage member is provided with a pulling part protruding peripherally. The top ring is slidably mounted, and the top ring is configured to drive the pulling part. The pulling part drives the armature to move towards the electromagnet through the linkage member. The rotation driving member is threadedly connected to the fixed shaft. The top ring is sleeved on the outer periphery of the rotation driving member and is in clearance fit with the rotation driving member. An end of the rotation driving member adjacent to the fixed shaft is provided with a driving part protruding peripherally. When the rotation driving member rotates forward in a direction away from the fixed shaft, the driving part drives the pulling part through the top ring.

BRIE DESCRIPTION OF THE. DRAWINGS

Figure 1:
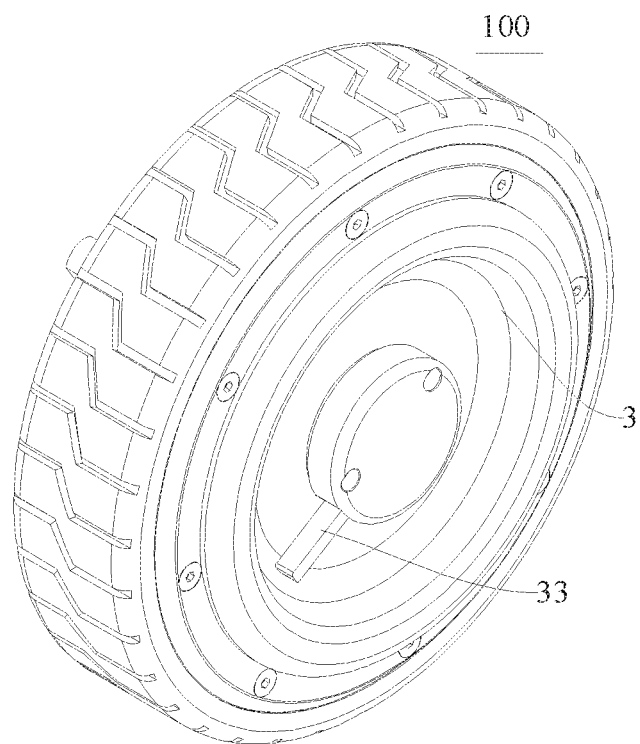
FIG. 1 is a schematic diagram of the structure of a scooter motor according to an embodiment of the present invention.

100: scooter motor; 1: fixed shaft; 2: stator unit; 3: rotor unit; 4: brake unit; 5: friction plate component; 6: electromagnetic clutch component; 7: electromagnet; 8: armature; 9: elastic member; 10: suction cup; 11: electromagnetic coil; 12: stator; 13: stator winding; 14: rotor; 15: magnetic conductive ring; 16: first end cover; 17: second end cover; 18: movable friction plate; 19: fixed friction plate; 20: linkage disc; 21: movable friction plate grasper; 22: limiting groove; 23: spline; 24: spline groove; 25: limiting disc; 26: brake part; 27: manual brake release unit; 28: linkage member; 29: pulling part; 30: top ring; 31: rotation driving member; 32: driving part; 33: handle; 34: first bearing; 35: second bearing; and 36: permanent magnet.

DETAILED DESCRIPTION OF THE EMBODIMENTS

Embodiments of the present invention are described in detail below and examples of the embodiments are shown in the drawings, in which the same or similar labels indicate throughout the same or similar elements or the elements with the same or similar functions. The embodiments described below with reference to the drawings are illustrative and intended to explain the present invention only and cannot be understood as a limitation to the present invention.

Figure 2:
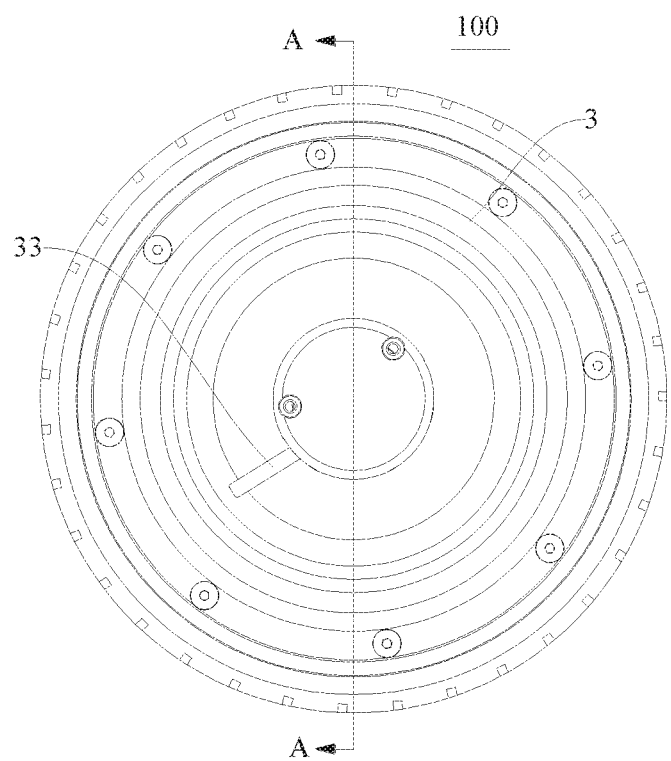
FIG. 2 is a front view of the scooter motor according to the embodiment of the present invention.
Figure 3:
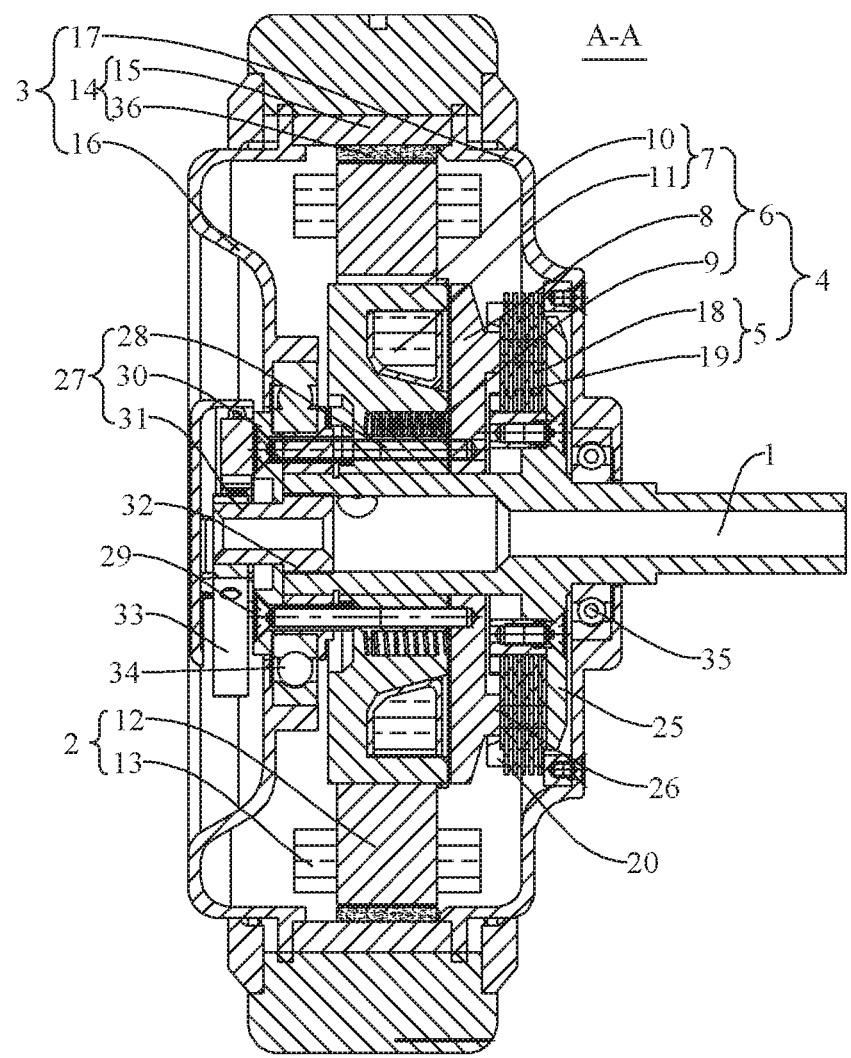
FIG. 3 is a cross sectional view along the A-A line in FIG. 2.
Figure 4:
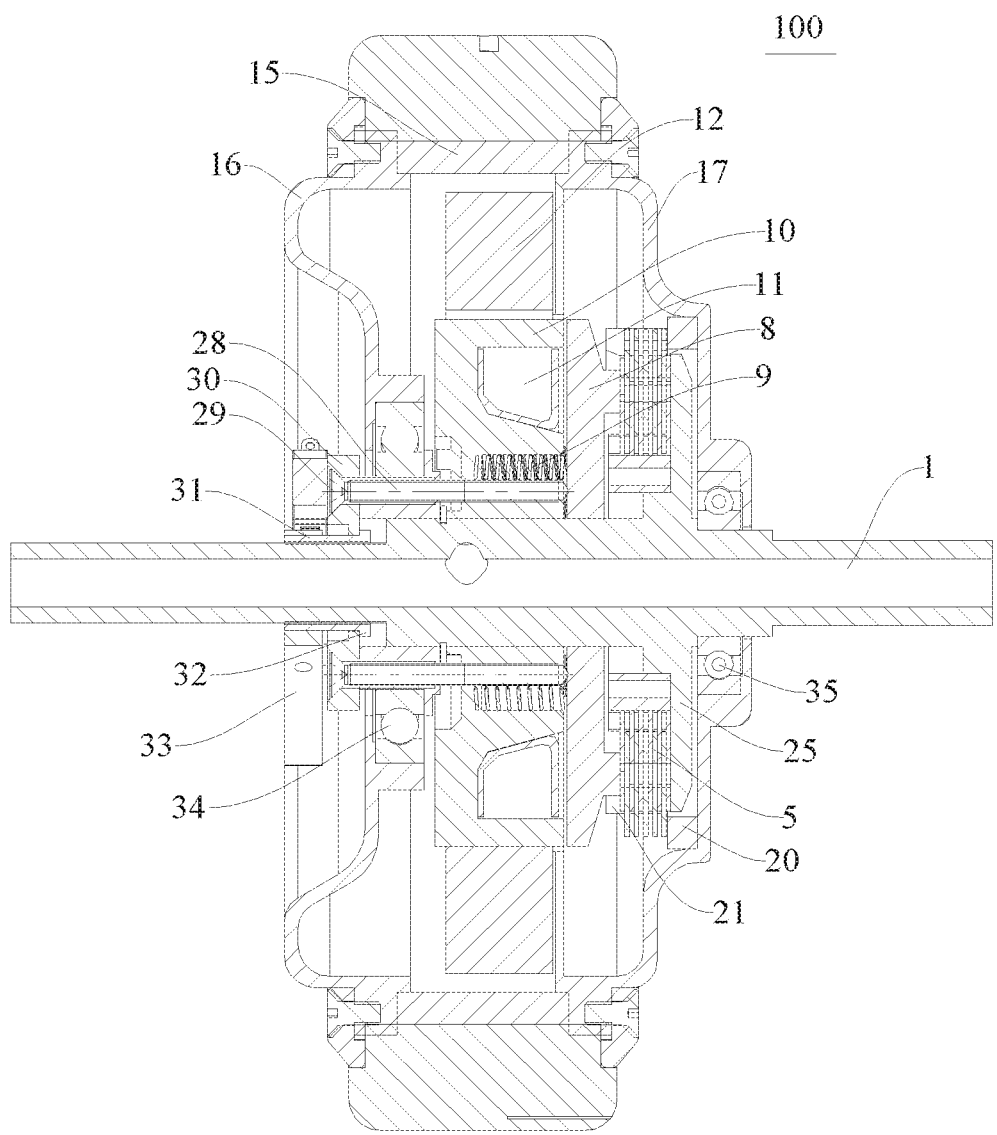
FIG. 4 is a schematic diagram of the structure of a scooter motor according to the other embodiment of the present invention.
Figure 5:
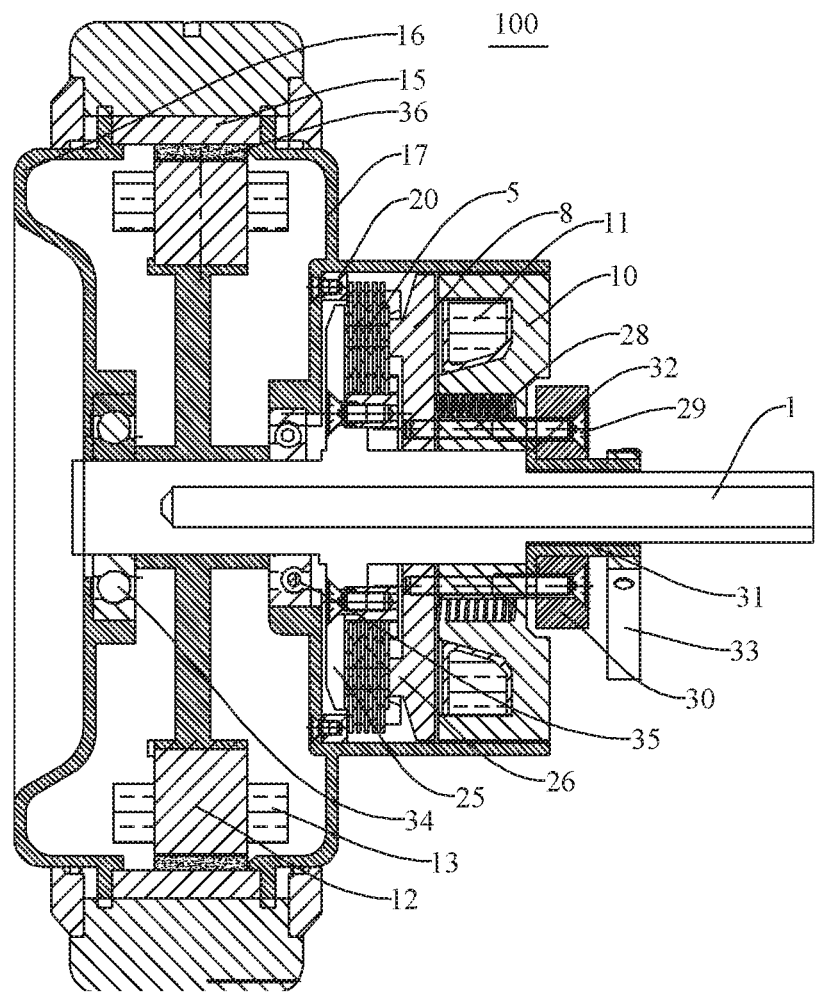
FIG. 5 is a schematic diagram of the structure of a scooter motor according to another embodiment of the present invention.
Figure 6:
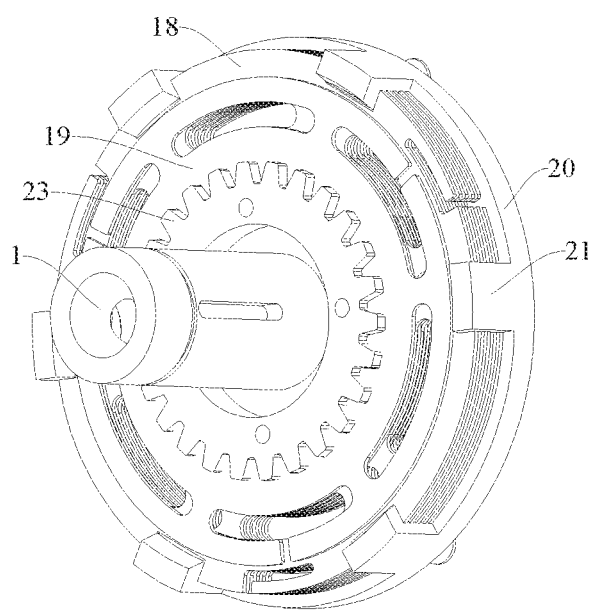
FIG. 6 is a schematic diagram of the cooperation between a friction plate component and a linkage disc according to an embodiment of the present invention.
Figure 7:
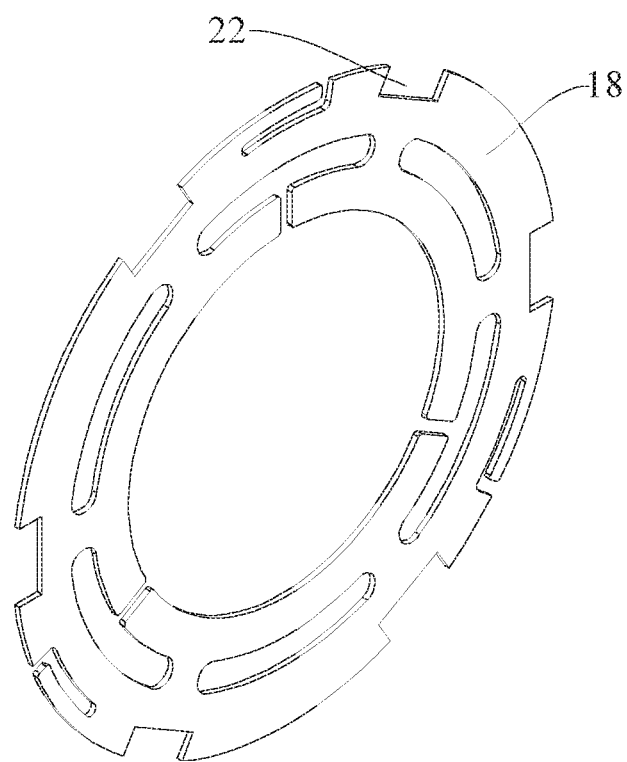
FIG. 7 is a schematic diagram of the structure of a fixed friction plate according to an embodiment of the present invention.
Figure 8:
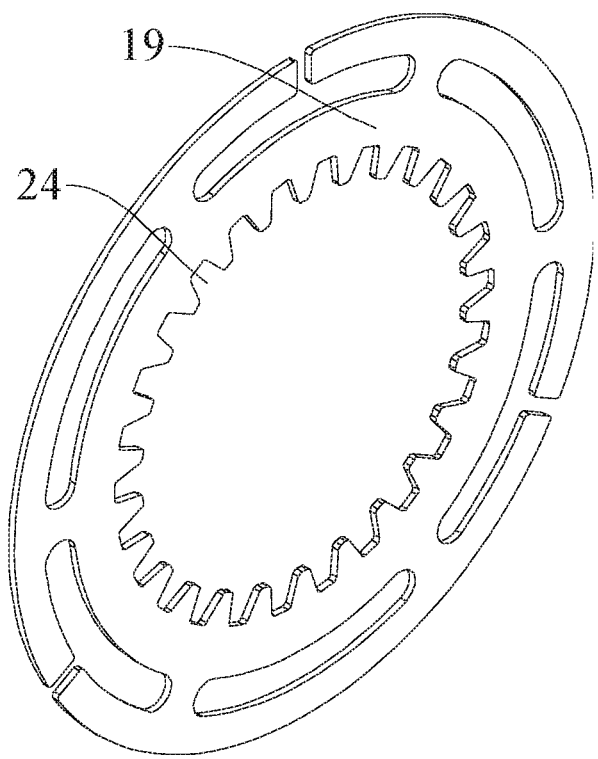
FIG. 8 is a schematic diagram of the structure of a movable friction plate according to an embodiment of the present invention.

As shown in FIGS. 1-8, the scooter motor 100 according to the embodiment of the present invention includes the fixed shaft 1, the stator unit 2, the rotor unit 3 and the brake unit 4.

Specifically, the fixed shaft 1 of the scooter motor 100 is shaped as a column extending along a straight line. The stator unit 2 is fixedly mounted on the fixed shaft 1 of the motor 100 and extends along the axial direction of the fixed shaft 1. The rotor unit 3 is rotatably mounted on the fixed shaft 1. The rotor unit 3 is a ring which is rotatably sleeved on the fixed shaft 1. The rotor unit 3 and the fixed shaft 1 is connected through bearings. Alternatively, the rotor unit 3 and the fixed shaft 1 is connected through a motor shell, that is, the motor shell cooperates with the fixed shaft 1 rotatably, and the rotor unit 3 is fixedly mounted on the motor shell.

Further, the brake unit 4 includes the friction plate component 5 and the electromagnetic clutch component 6. The friction plate component 5 is matched between the stator unit 2 and the rotor unit 3, or the friction plate component 5 is matched between the fixed shaft 1 and the rotor unit 3. The electromagnetic clutch component 6 controls the friction plate component 5 to press to brake. Specifically, the electromagnetic clutch component 6 can control the friction plate components 5 to perform mutual friction, and use the friction force to limit the mutual rotation between the stator unit 2 and the rotor unit 3 or the mutual rotation between the fixed shaft 1 and the rotor unit 3. The electromagnetic clutch component 6 can also control the friction plate component 5 to perform mutual contact and friction, so as to control the mutual limitation between the stator unit 2 and the rotor unit 3 and the mutual limitation between the fixed shaft 1 and the rotor unit 3.

Specifically, the friction plate component 5 includes a plurality of movable friction plates 18 and a plurality of fixed friction plates 19. The movable friction plates 18 are linked with the rotor unit 3, and the fixed friction plates 19 are slidably mounted on the fixed shaft 1 and are limited in rotation. When the motor is de-energized, the electromagnetic clutch component 6 drives the fixed friction plates 19 to press the movable friction plates 18 to brake. That is to say, the plurality of movable friction plates 18 and the plurality of fixed friction plates 19 are arranged alternately in turn, the movable friction plates 18 are fixed to the rotor unit 3, and the movable friction plates 18 can be connected to the motor end cover. The fixed friction plates 19 are slidably connected to the stator unit 2, and the fixed friction plates 19 is sleeved on the fixed shaft 1 and slidably connected to the stator unit 2. Specifically, the movable friction plates 18 slides relative to the rotor unit 3 along the axial direction of the fixed shaft 1, but does not rotate relative to the rotor unit 3. The fixed friction plates 19 slides relative to the stator unit 2 along the axial direction of the fixed shaft 1, but does not rotate relative to the stator unit 2.

When the brake unit 4 presses the friction plate component 5 to brake, the brake unit 4 squeezes the movable friction plates 18 and the fixed friction plates 19 along the axial direction of the fixed shaft 1. The movable friction plates 18 and the fixed friction plates 19 contact each other and produce the friction force after being pressed together, so as to realize braking.

By using the movable friction plates 18 and the fixed friction plates 19 arranged alternately in turn, the friction between the movable friction plates 18 and the fixed friction plates 19 is used to provide the braking force for the motor 100, additionally the friction area between the movable friction plates 18 and the fixed friction plates 19 is increased to further enhance the friction force. Moreover, the friction plate component 5 with the above structure makes full use of the gap between the fixed friction plates 19 and the movable friction plates, occupying a small space, and improving the space utilization rate of the motor 100.

Therefore, according to the scooter motor 100 of the embodiment of the present invention, the stator unit 2 and the rotor unit 3 are used to cooperate with each other to drive the fixed shaft 1 to rotate to drive the scooter to travel. Additionally, the friction plate component 5 and the electromagnetic clutch component 6 are used to control the rotation of the rotor unit 3 to realize the braking of the scooter. The brake unit 4 is integrated into the scooter motor 100, which improves the performance of the scooter motor 100. The friction plate component 5 includes a plurality of movable friction plates 18 and a plurality of fixed friction plates 19, and the movable friction plates 18 and the fixed friction plates 19 are stacked at intervals. Compared with the single-disc friction plate component, the contact friction surface between the movable friction plates 18 and the fixed friction plates 19 is greatly increased, and the corresponding braking force is significantly improved. Besides, since the braking force generated by the electromagnetic clutch component 6 is transmitted between the friction plate components 5 that are stacked at intervals, the braking force is doubled, which provides a high-torque de-energized automatic braking and parking function. Moreover, the scooter motor adopts the direct-drive motor and omits the reduction gearbox, which not only simplifies the structure design of the scooter motor, but also improves the working efficiency of the scooter motor.

According to an embodiment of the present invention, the electromagnetic clutch component 6 includes the electromagnet 7, the armature 8 and the elastic member 9. The electromagnet 7 is sleeved on the fixed shaft 1 of the scooter motor 100 and is fixedly connected to the fixed shaft 1. The armature 8 is sleeved on the fixed shaft 1 and slidably cooperates with the fixed shaft 1. The armature 8 moves between a first position and a second position along the axial direction of the fixed shaft 1. When the armature 8 is in the first position, the armature 8 squeezes the friction plate component 5 and presses the friction plate component 5, and the movable friction plates 18 and the fixed friction plates 19 perform mutual friction under the pressure of the armature 8 to realize the braking of the scooter motor 100. When the armature 8 is in the second position, the armature 8 is separated from the friction plate component 5, and the friction plates are released from the pressing state, and thus the braking effect on the scooter motor 100 can be relieved. The elastic member 9 is configured between the armature 8 and the electromagnet 7. During the braking process, the electromagnet 7 is de-energized, and the armature 8 presses the friction plate component 5 under the action of the elastic member 9 to brake. In other words, the electromagnet 7 generates an electromagnetic field in the conductive state to attract the armature 8, and the armature 8 squeezes the elastic member 9 and moves from the first position to the second position. When the electromagnet 7 is de-energized, the electromagnetic field generated by the electromagnet 7 is eliminated, and the armature 8 moves from the second position to the first position under the action of the elastic member 9 and presses the friction plate component 5. After the friction plate component 5 is pressed, the friction force realizes the braking of the scooter motor 100.

The armature 8 and the elastic member 9 are used to cooperate with each other to squeeze the friction plate component 5 to realize the purpose of friction braking. The armature 8 and the electromagnet 7 are used to cooperate with each other to squeeze the elastic member 9 to relieve the pressing effect of the armature 8 on the friction plate component 5, and then the braking effect on the scooter motor 100 is relieved.

The electromagnetic clutch component 6 with the above structure effectively controls whether the scooter motor 100 is braked or not. Besides, when the electromagnet 7 is powered off, the elastic force of the elastic member 9 pushes the armature 8 to press the fiction plate component 5, and at this time, the scooter motor 100 is in the braking state, thus ensuring that the braking system of the vehicle can normally brake and park when a fault affects the power supply of the scooter, which is beneficial to improve the safety performance of the vehicle.

According to an embodiment of the present invention, the electromagnet 7 includes the suction cup 10 and the electromagnetic coil 11. The suction cup 10 is sleeved on the fixed shaft 1 and is fixedly connected to the fixed shaft 1. The stator unit 2 is fixedly connected to the suction cup 10. The suction cup 10 is provided with a containing groove that is open towards the armature 8 for mounting the elastic member 9. One part of the elastic member 9 is contained in the containing groove, and the other part of the elastic member 9 extends out of the containing groove and abuts on the armature 8. The containing groove facilitates the assembly of the elastic member 9, and improves the assembly stability of the elastic member 9, thereby preventing the elastic member 9 from shaking and affecting the stability of the cooperation between the elastic member 9 and the armature 8. Specifically, the electromagnetic coil 11 is built in the suction cup 10, and the electromagnetic coil 11 is used to attract the armature 8. A installation groove of the electromagnetic coil 11 is defined in the suction cup 10, and the electromagnetic coil 11 is installed in the installation groove of the electromagnetic coil 11. Alternatively, the electromagnetic coil 11 and the suction cup 10 are an integral structure, for example, when the suction cup 10 is formed, the electromagnetic coil 11 is poured into the suction cup 10. Therefore, the compact structure of the electromagnet 7 is improved and the occupied space of electromagnet 7 can be saved.

According to an embodiment of the present invention, the stator unit 2 includes the stator 12 fixed on the outer periphery of the suction cup 10, and the stator winding 13 mounted on the stator 12. The stator winding 13 is formed into the electromagnetic coil 11 fixed on the stator 12. The stator 12 can be formed as a ring sleeved on the fixed shaft 1 or a ring sleeved on the suction cup 10. In case that the stator 12 is sleeved on the suction cup 10, the size of the scooter motor 100 on the central axis of the fixed shaft 1 can be reduced, which is beneficial to reduce the volume of the motor 100, and can facilitate the assembly of the motor 100.

According to an embodiment of the present invention, the rotor unit 3 includes the rotor 14 and the motor end cover. The rotor 14 includes the magnetic conductive ring 15 and the permanent magnet 36. The magnetic conductive ring 15 is sleeved on the permanent magnet 36 and is fixedly connected to the permanent magnet 36, and the rotor 14 is arranged along the outer peripheral direction of the stator 12. The motor end cover includes the first end cover 16 and the second end cover 17, and the first end cover 16 and the second end cover 17 are integratedly connected by the magnetic conductive ring 15 to form a closed internal containing space. The first end cover 16 is rotatably sleeved on the fixed shaft 1, and the outer peripheral edge of the first end cover 16 is connected to the end edge of one axial end of the magnetic conductive ring 15, while the second end cover 17 is rotatably sleeved on the fixed shaft 1, and the outer peripheral edge of the second end cover 17 is connected to the end edge of the other axial end of the magnetic conductive ring 15. The first bearing 34 is arranged between the first end cover 16 and the fixed shaft 1, and the second bearing 35 is arranged between the second end cover 17 and the fixed shaft 1.

Specifically, the stator unit 2, the rotor 14, the friction plate component 5 and the electromagnetic clutch component 6 are all arranged between the first end cover 16 and the second end cover 17. Alternatively, the stator unit 2 and the rotor 14 are arranged between the first end cover 16 and the second end cover 17. The brake unit 4 is arranged on the side of the first end cover 16 back towards the second end cover 7. Alternatively, the brake unit 4 is arranged on the side of the second end cover 17 back towards the first end cover 16.

Therefore, the first end cover 16, the second end cover 17 and the magnetic conductive ring 15 can cooperate to form a shell to protect the scooter motor 100, and the tire of the scooter be sleeved on the magnetic conductive ring 15.

Specifically, the first end cover 16 is rotatably mounted on the fixed shaft 1 through the first bearing 34, and the second end cover 17 is rotatably mounted on the fixed shaft 1 through the second bearing 35. By setting the first bearing 34 between the first end cover 16 and the fixed shaft 1, the friction between the first end cover 16 and the fixed shaft 1 is prevented, and the rotating resistance of the fixed shaft 1 in the working process of the scooter motor 100 is reduced, thereby improving the work efficiency and preventing the mutual damage between the first end cover 16 and the fixed shaft 1. The stability of the cooperation between the first end cover 16 and the fixed shaft 1 is improved, and the deviation between the fixed shaft 1 and the first end cover 16 is prevented. Similarly, by setting the second bearing 35 between the second end cover 17 and the fixed shaft 1, the friction damage between the second end cover 17 and the fixed shaft 1 is prevented, which is conducive to reducing the rotating resistance of the fixed shaft 1 and improving the working efficiency of the scooter motor 100.

According to an embodiment of the present invention, the linkage disc 20 is fixed on the surface of the motor end cover facing the movable friction plates 18. A plurality of movable friction plate graspers 21 are arranged along the peripheral direction of the linkage disc 20, and the movable friction plate graspers 21 protrude towards the movable friction plates 18 in the axial direction of the fixed shaft 1. The limiting grooves 22 fit with the movable friction plate graspers 21 are arranged along the peripheral direction of the plurality of movable friction plates 18, and the plurality of movable friction plates 18 are configured on the linkage disc 20 and are limited by the movable friction plate graspers 21. The plurality of limiting grooves 22 of the movable friction plates 18 are clamped on the movable friction plate graspers 21 of the linkage disc 20 in one-to-one corresponding manner. The motor end cover is linked with the movable friction plates 18 through the linkage disc 20 and the movable friction plate graspers 21. The movable friction plates 18 can slide relative to the motor end cover in the axial direction of the fixed shaft 1 under the action of the linkage disc 20 and the movable friction plate graspers 21, but cannot rotate relative to the motor end cover.

By setting the linkage disc 20 and the movable friction plate graspers 21 on the motor end cover, which facilitates the assembly of the movable friction plates 18, the movable friction plates 18 can not only move along the axial direction of the fixed shaft 1 to further cooperate with the fixed friction plates 19, so as to realize the friction braking, but also the movable friction plates 18 and the motor end cover are ensured to maintain stationary in the peripheral direction of the fixed shaft 1, so as to prevent the motor end cover from rotating relative to the movable friction plates 18 and improve the braking effect of the motor 100.

According to an embodiment of the present invention, the spline 23 is fixedly arranged on the fixed shaft 1, and the spline groove 24 matched with the spline 23 is arranged on the inner periphery of the fixed friction plates 19. The cross-sectional shape of the spline 23 is identical to the cross-sectional shape of the spline groove 24. The fixed friction plates 19 are sleeved on the spline 23 of the fixed shaft 1, and the fixed friction plates 19 can slide relative to the fixed shaft 1. The spline 23 cooperates with the spline groove 24 to prohibit the fixed friction plates 19 from rotating relative to the fixed shaft 1.

By setting the spline 23 and the spline groove 24, the cooperation of the spline 23 and the spline groove 24 not only ensures that the fixed friction plates 19 can slide along the axial direction of the fixed shaft 1 to further cooperate with the movable friction plates 18 to realize the friction braking, but also prevents the fixed friction plates 19 from rotating relative to the fixed shaft 1 thus improving the braking effect of the motor 100.

According to an embodiment of the present invention, the limiting disc 25 is fixed on the side of the spline 23 far away from the armature 8. The brake part 26 extends from the surface of the armature 8 facing the fixed friction plates 19, and the brake part 26 forms into a convex block protruding towards the fixed friction plates 19. The plurality of fixed friction plates 19 are limited between the brake part 26 and the limiting disc 25. The brake part 26 cooperates with the limiting disc 25 to improve the pressing effect and the pressing force of the electromagnetic clutch component 6 on the friction plate component 5, thereby prevent the braking effect from being affected by the insufficient pressing force of the armature 8 on the friction plate component 5.

According to an embodiment of the present invention, the scooter motor 100 further includes the manual brake release unit 27. The manual brake release unit 27 includes the linkage member 28, the top ring 30 and the rotation driving member 31. One end of the linkage member 28 penetrates through the electromagnet 7 and is fixedly connected to the armature 8. The other end of the linkage member 28 is provided with the pulling part 29 protruding peripherally, and the linkage member 28 can move along the axial direction of the fixed shaft 1. The top ring 30 is slidably mounted and is sleeved on the fixed shaft 1 and can slide along the axial direction of the fixed shaft 1. The top ring 30 is connected to the pulling part 29 to drive the pulling part 29. The pulling part 29 drives the linkage member 28 to move under the driving action of the top ring 30, so as to drive the armature 8 to move towards the electromagnet 7. The armature 8 moves towards the electromagnet 7 to further squeeze the elastic member 9, and releases the pressing effect on the friction plate component 5 to further relieve the braking effect of the brake unit 4 on the stator unit 2. Specifically, the rotation driving member 31 is threadedly connected to the fixed shaft 1, the rotation driving member 31 can be sleeved on the fixed shaft 1, and the inner peripheral wall of the rotation driving member 31 and the outer peripheral wall of the fixed shaft 1 form mutual meshing threads. Alternatively, the rotation driving member 31 can be inserted into the end of the fixed shaft 1. An open thread cavity can be defined in the end of the fixed shaft 1, the rotation driving member 31 is inserted into the thread cavity, and the outer peripheral wall of the rotation driving member 31 is threaded with the inner peripheral wall of the threaded cavity. When the rotation driving member 31 rotates along the peripheral direction of the fixed shaft 1, the corresponding axial displacement is generated. The top ring 30 is sleeved on the outer periphery of the rotation driving member 31 and is in clearance fit with the rotation driving member 31. The top ring 30 is sleeved on the rotation driving member 31, and the inner peripheral wall of the top ring 30 is larger than the outer peripheral wall of the rotation driving member 31. One end of the rotation driving member 31 adjacent to the fixed shaft 1 is provided with the driving part 32 protruding peripherally, and the driving part 32 forms into a lug boss. The lug boss is arranged around the rotation driving member 31 and protrudes outward along the radial direction of the rotation driving member 31. The outer diameter of the driving part 32 is larger than the inner diameter of the top ring 30. The driving part 32 is located between the top ring 30 and the armature 8. When the driving part 32 moves with the rotation driving member 31 in the direction far away from the armature 8, the side wall of the driving part 32 abuts with the side wall of the top ring 30, so as to drive the top ring 30 to move away from the armature 8. When the rotation driving member 31 rotates forward in a direction away from the fixed shaft 1, that is, away from the armature 8, the driving part 32 drives the pulling part 29 to move through the top ring 30, so as to drive the armature 8 to move towards the electromagnet 7.

Specifically, the handle 33 exposed out of the motor end cover is arranged on the rotation driving member 31, and the user can directly operate the manual brake release unit 27 by the handle 33 to control the braking state of the scooter motor 100.

The above are preferred embodiments of the present invention, and those skilled in the art of the present invention can also make changes and modifications to the above-mentioned embodiments. Therefore, the present invention is not limited to the above-mentioned specific embodiments. Any obvious improvement, replacement or modification made by those skilled in the art on the basis of the present invention shall fall within the scope of protection of the present invention.

What is claimed is:
1. A scooter motor, comprising:
   a stator unit, wherein the stator unit is fixedly mounted on a fixed shaft of the scooter motor;
   a rotor unit, wherein the rotor unit is rotatably mounted on the fixed shaft;
   a brake unit, wherein the brake unit comprises a friction plate component and an electromagnetic clutch component;
   an electromagnet, wherein the electromagnet is sleeved on the fixed shaft and the electromagnet is fixedly connected to the fixed shaft;
   an armature, wherein the armature is sleeved on the fixed shaft and the armature is configured to slidably cooperate with the fixed shaft; and
   an elastic member, wherein the elastic member is configured between the armature and the electromagnet; wherein the electromagnetic clutch component drives the friction plate component to press the brake when the scooter motor is de-energized;
   the friction plate component comprises a plurality of movable friction plates and a plurality of fixed. friction plates, wherein
   the plurality of movable friction plates and the plurality of xed friction plates are stacked at intervals;
   the plurality of movable friction plates are linked with the rotor unit, and the plurality of fixed friction plates are slidably mounted on the fixed shaft and the plurality of fixed friction plates are limited in rotation;
   the electromagnetic clutch component drives the plurality of fixed friction plates to press the plurality of movable friction plates to brake when the scooter motor is de-energized; and
   the electromagnet is configured to be de-energized, and the armature is configured to press the friction plate component under an action of the elastic member to brake when the scooter motor is de-energized.

2. The scooter motor according to claim 1, wherein the electromagnet comprises:
   a suction cup, wherein the suction cup is sleeved on the fixed shaft and the suction cup is fixedly connected to the fixed shaft, and the suction cup is further provided with a containing groove for mounting the elastic member; and
   an electromagnetic coil, wherein the electromagnetic coil is built in the suction cup, and the electromagnetic coil is configured to attract the armature.

3. The scooter motor according to claim 2, wherein the stator unit comprises a stator fixed on an outer periphery of the suction cup, and a stator winding mounted on the stator.

4. The scooter motor according to claim 3, wherein the rotor unit comprises:
   a rotor, wherein the rotor comprises a magnetic conductive ring and a permanent magnet, wherein the magnetic conductive ring is sleeved on the permanent magnet and the magnetic conductive ring is fixedly connected to the permanent magnet;
   wherein the rotor is arranged along an outer peripheral direction of the stator; and
   a motor end cover, wherein the motor end cover comprises a first end cover and a second end cover;
   wherein the first end cover and the second end cover are integratedly connected by the magnetic conductive ring to form a closed internal accommodation space.

5. The scooter motor according to claim 4, wherein the first end cover is rotatably mounted on the fixed shaft through a first bearing, and the second end cover is rotatably mounted on the fixed shaft through a second bearing.

6. The scooter motor according to claim 5, wherein a linkage disc is fixed on a surface of the motor end cover, and the surface of the motor end cover faces the plurality of movable friction plates; a plurality of movable friction plate graspers are arranged along a peripheral direction of the linkage disc, and a plurality of limiting grooves fit with the plurality of movable friction plate graspers are arranged along a peripheral direction of the plurality of movable friction plates; the plurality of movable friction plates are configured on the linkage disc and the plurality of movable friction plates are limited by the plurality of movable friction plate graspers; the motor end cover is linked with the plurality of movable friction plates through the linkage disc and the plurality of movable friction plate graspers.

7. The scooter motor according to claim 6, wherein a spline is fixedly on the fixed shaft, and a spline groove matched with the spline is arranged on an inner periphery of the plurality of fixed friction plates; the plurality of fixed friction plates are configured to slide relative to the fixed shaft, and the spline cooperates with the spline groove to prohibit the plurality of fixed friction plates from rotating relative to the fixed shaft.

8. The scooter motor according to claim 7, wherein a limiting disc is arranged on a side of the spline, and the side of the spline is far away from the armature; a brake part extends from a surface of the armature, and the surface of the armature faces the plurality of fixed friction plates; the plurality of fixed friction plates are limited between the brake part and the limiting disc.

9. The scooter motor according to claim 8, further comprising a manual brake release unit, wherein the manual brake release unit comprises:
   a linkage member, wherein a first end of the linkage member penetrates through the electromagnet and the linkage member is fixedly connected to the armature, and a second end of the linkage member is provided with a pulling part protruding peripherally;
   a top ring, wherein the top ring is configured to drive the pulling part, wherein the pulling part drives the armature to move towards the electromagnet through the linkage member; and
   a rotation driving member, wherein the rotation driving member is threadedly connected to the fixed shaft; the top ring is sleeved on an outer periphery of the rotation driving member and the top ring is in clearance fit with the rotation driving member; an end of the rotation driving member adjacent to the fixed shaft is provided with a driving part protruding peripherally; when the rotation driving member rotates forward in a direction away from the fixed shaft, the driving part drives the pulling part through the top ring.

* * * * *